(12) United States Patent
Jen et al.

(10) Patent No.: US 12,235,460 B2
(45) Date of Patent: Feb. 25, 2025

(54) HEAD MOUNTED DISPLAY

(71) Applicant: Wistron Corp., New Taipei (TW)

(72) Inventors: Tsu Yin Jen, New Taipei (TW); Pei Hsin Huang, New Taipei (TW); Lee-Hua Yu, New Taipei (TW)

(73) Assignee: Wistron Corp., New Taipei (TW)

( * ) Notice: Subject to any disclaimer, the term of this patent is extended or adjusted under 35 U.S.C. 154(b) by 522 days.

(21) Appl. No.: 17/676,762

(22) Filed: Feb. 21, 2022

(65) Prior Publication Data

US 2023/0091959 A1 Mar. 23, 2023

(30) Foreign Application Priority Data

Sep. 22, 2021 (TW) ................................ 110135071

(51) Int. Cl.
*G02B 27/01* (2006.01)

(52) U.S. Cl.
CPC .. *G02B 27/0176* (2013.01); *G02B 2027/0178* (2013.01)

(58) Field of Classification Search
CPC .. G02B 27/01; G02B 27/017; G02B 27/0101; G02B 27/0158; G02B 27/0172; G02B 27/0176; G02B 27/0178; G02B 27/0179; G02B 7/00; G02B 7/002; G02B 7/12; G02B 7/16; G02B 2027/0132; G02B 2027/0134; G02B 2027/0154; G02B 2027/0178

See application file for complete search history.

(56) References Cited

U.S. PATENT DOCUMENTS

| | | | |
|---|---|---|---|
| 2016/0246059 A1* | 8/2016 | Halpin | G02B 27/0176 |
| 2017/0108714 A1* | 4/2017 | Kuczewski | G02C 5/146 |
| 2020/0371365 A1* | 11/2020 | Kamakura | G02B 27/0172 |
| 2021/0063748 A1* | 3/2021 | Terashima | G02B 6/0048 |
| 2022/0004004 A1* | 1/2022 | Masuda | G02B 27/0101 |

* cited by examiner

*Primary Examiner* — Sultan Chowdhury

(57) ABSTRACT

A head mounted display is provided. The head mounted display includes a first display module, a second display module, an adjustment mechanism, a first frame temple and a second frame temple. The adjustment mechanism is connected to the first display module and the second display module, wherein the adjustment mechanism is adapted to move the first display module and the second display module. The first frame temple is connected to the adjustment mechanism, wherein the first frame temple is adapted to move the adjustment mechanism. The second frame temple is connected to the adjustment mechanism, wherein the second frame temple is adapted to move the adjustment mechanism, the first frame temple and the second frame temple are adapted to rotate between a first posture and a second posture.

19 Claims, 20 Drawing Sheets

HEAD MOUNTED DISPLAY

CROSS REFERENCE TO RELATED APPLICATIONS

This application claims priority of Taiwan Patent Application No. 110135071, filed on Sep. 22, 2021, the entirety of which is incorporated by reference herein.

BACKGROUND OF THE INVENTION

Field of the Invention

The present invention relates to a head mounted display, and in particular to a head mounted display which can modify the distance between the display modules automatically.

Description of the Related Art

The head mounted display is a new type of technological product that has been developed for manufacture in various factories in recent years. It is important that it be applicable and convenient for each individual user to wear. The distance between the eyes (Interpupillary Distance, IPD) on each person is different, and so conventional head mounted displays are not one-size-fits-all. A misaligned interpupillary distance or an improper headband display may cause images to come out blurry, causing the user to experience dizziness and eye fatigue.

The display module of the head mounted display is the latest developmental trend in multimedia playback devices that are used in Augmented Reality (AR) systems, Virtual Reality (VR) systems, and Mixed Reality (MR) systems. Most of the Augmented Reality (AR) products on the market do not have the capability to adjust the IPD. In addition to affecting the image quality, an incorrect interpupillary distance may cause the user discomfort.

For consumers, a wider FOV (Field of View) provides a greater sense of immersion, and gamers can therefore have a better experience playing games and witching videos. The eye-box is a square area in which the display module can effectively display images at a certain distance. If the eyes of the user exceed the area of the eye-box, the user's experience may be affected.

In the case of a fixed-eye relief, when the FOV (Field of View) is increased to enlarge the image size, the eye-box will shrink. When the eye-box becomes smaller, the visible clear-image range to the eyes will also become smaller. At this time, the user's IPD needs to be more accurately aligned with the eye-box center, so that the viewed images can be clear and complete.

BRIEF SUMMARY OF THE INVENTION

Embodiments of the invention are provided to address the aforementioned difficulties.

In one embodiment, a head mounted display is provided. The head mounted display includes a first display module, a second display module, an adjustment mechanism, a first frame temple and a second frame temple. The adjustment mechanism is connected to the first display module and the second display module, wherein the adjustment mechanism is adapted to move the first display module and the second display module. The first frame temple is connected to the adjustment mechanism, wherein the first frame temple is adapted to move the adjustment mechanism. The second frame temple is connected to the adjustment mechanism, wherein the second frame temple is adapted to move the adjustment mechanism, the first frame temple and the second frame temple are adapted to rotate between a first posture and a second posture, and when the first frame temple and the second frame temple are in the first posture, a first distance is formed between the first display module and the second display module, and when the first frame temple and the second frame temple are in the second posture, a second distance is formed between the first display module and the second display module.

Utilizing the head mounted display of the embodiments of the invention, the Eye-box of the display modules can sufficiently cover the IPD of most users and the difference in the design value. When multiple people need to use the head mounted display interactively in one occasion, the head mounted display can be directly worn. The head mounted display automatically completes the IPD adjustment after being worn, and optimizes the operation by the frame temple driving mechanism. Therefore, the user can use it more intuitively and more conveniently. When the user's head width and IPD are beyond the normal human range or the eye-box of the display modules is too small, and the adjustment of the frame temple is no longer sufficient, and the embodiments of the invention additionally provide IPD fine-tuning mechanisms to address this situation. The user can use the exterior ring or knob to fine-tune the distance between the display modules to improve his visual comfort and immersion.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
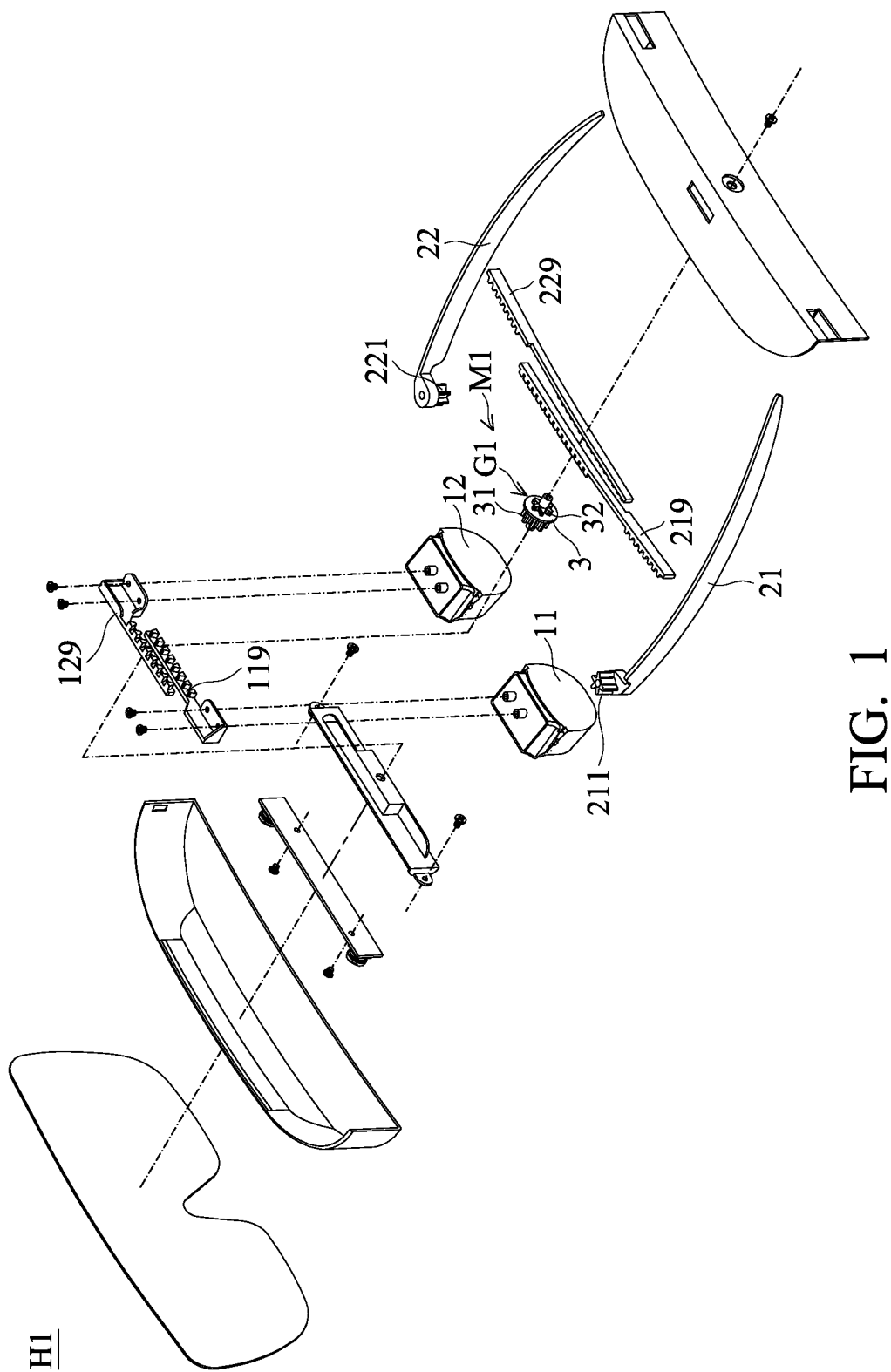
FIG. 1 is an exploded view of a head mounted display of a first embodiment of the invention.
Figure 2A:
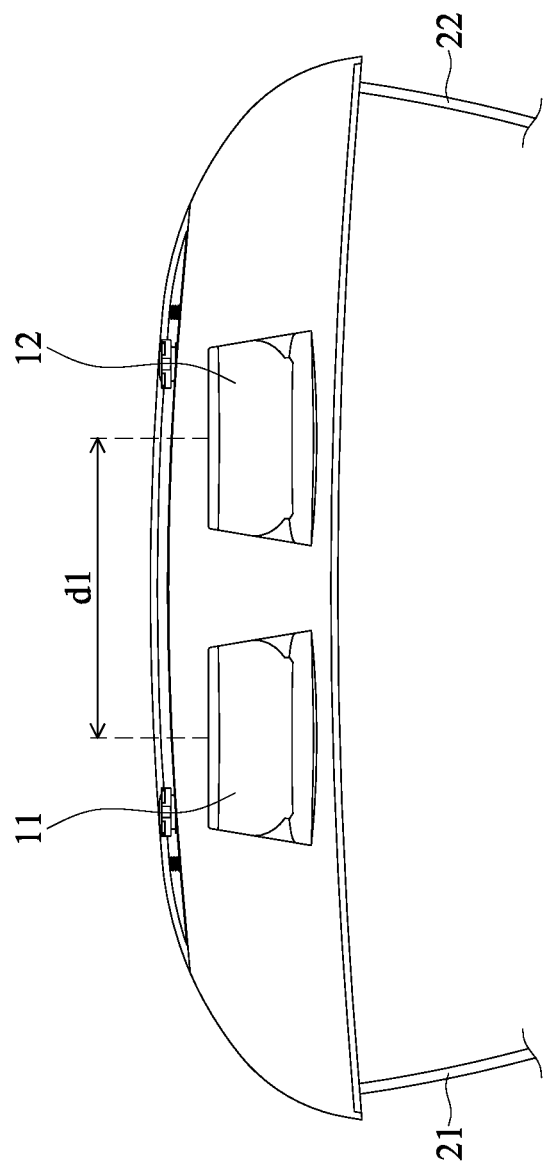
FIGS. 2A and 2B show the head mounted display of the first embodiment of the invention being adjusted.
Figure 2B:
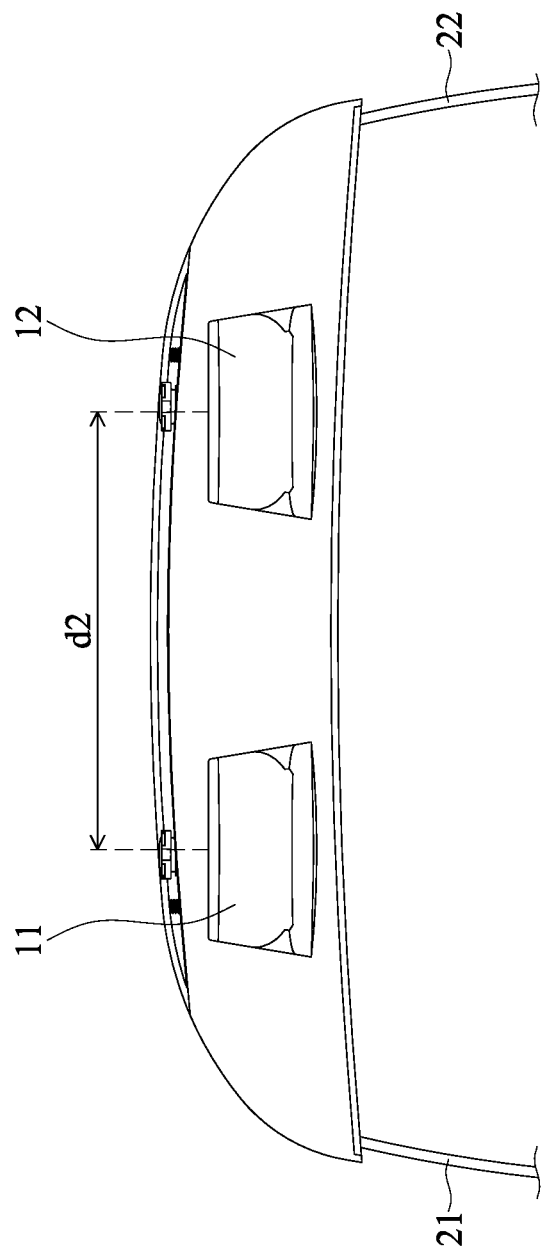

FIG. 1 is an exploded view of a head mounted display of a first embodiment of the invention. FIGS. 2A and 2B show the head mounted display of the first embodiment of the invention being adjusted. With reference to FIGS. 1, 2A and 2B, the head mounted display H1 of the first embodiment of the invention includes a first display module 11, a second display module 12, an adjustment mechanism M1, a first frame temple 21 and a second frame temple 22. The adjustment mechanism M1 is connected to the first display module 11 and the second display module 12, wherein the adjustment mechanism M1 is adapted to move the first display module 11 and the second display module 12. The first frame temple 21 is connected to the adjustment mechanism M1, wherein the first frame temple 21 is adapted to move the adjustment mechanism M1. The second frame temple 22 is connected to the adjustment mechanism M1, wherein the second frame temple 22 is adapted to move the adjustment mechanism M1. The first frame temple 21 and the second frame temple 22 are adapted to rotate between a first posture (FIG. 2A) and a second posture (FIG. 2B). When the first frame temple 21 and the second frame temple 22 are in the first posture (FIG. 2A), a first distance d1 is formed between the first display module 11 and the second display module 12. When the first frame temple 21 and the second frame temple 22 are in the second posture (FIG. 2B), a second distance d2 is formed between the first display module 11 and the second display module 12. In one embodiment, the first distance d1 can be 51 mm, and the second distance d2 can be 71 mm. The disclosure is not meant to restrict the invention.

With reference to FIG. 1, in the first embodiment of the invention, the adjustment mechanism M1 comprises a gear unit G1, a first module rack 119, a second module rack 129, a first driven rack 219 and a second driven rack 229. The first frame temple 21 comprises a first temple gear 211. The second frame temple 22 comprises a second temple gear 221. The first temple gear 211 is connected to the first driven rack 219 and adapted to move the first driven rack 219. The second temple gear 221 is connected to the second driven rack 229 and adapted to move the second driven rack 229. The first driven rack 219 and the second driven rack 229 are connected to the gear unit G1 and adapted to move the gear unit G1. The gear unit G1 is connected to the first module rack 119 and the second module rack 129 and is adapted to move the first module rack 119 and the second module rack 129. The first display module 11 is connected to the first module rack 119, and the second display module 12 is connected to the second module rack 129.

Figure 3A:
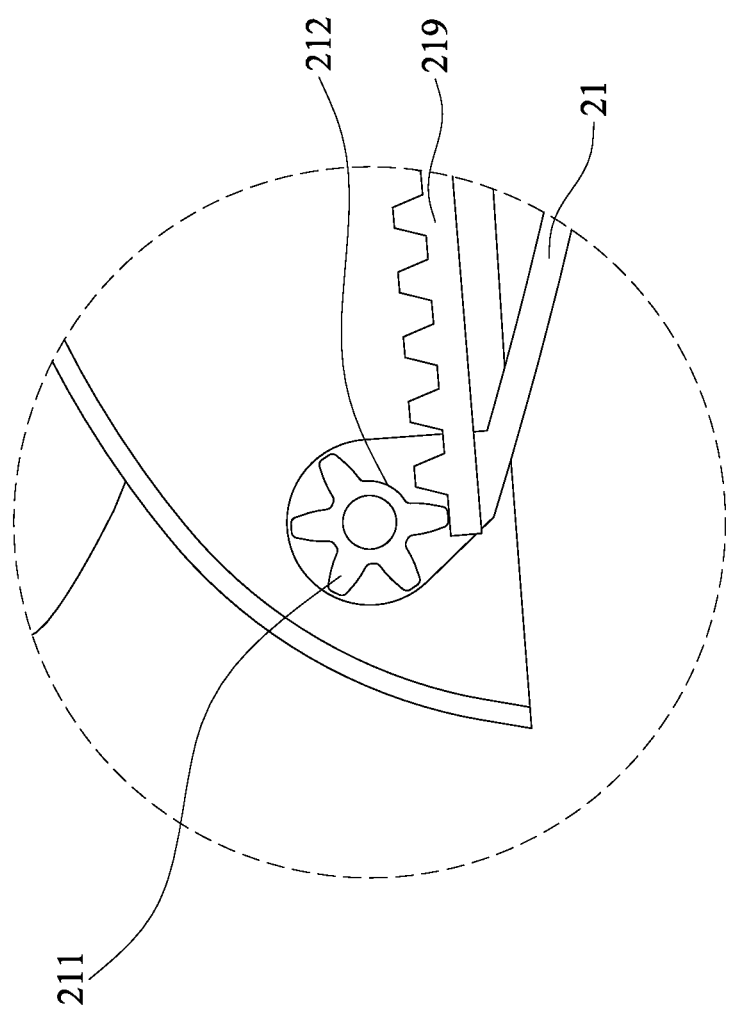
FIGS. 3A, 3B and 3C show the details of the first temple gear of the embodiment of the invention.
Figure 3B:
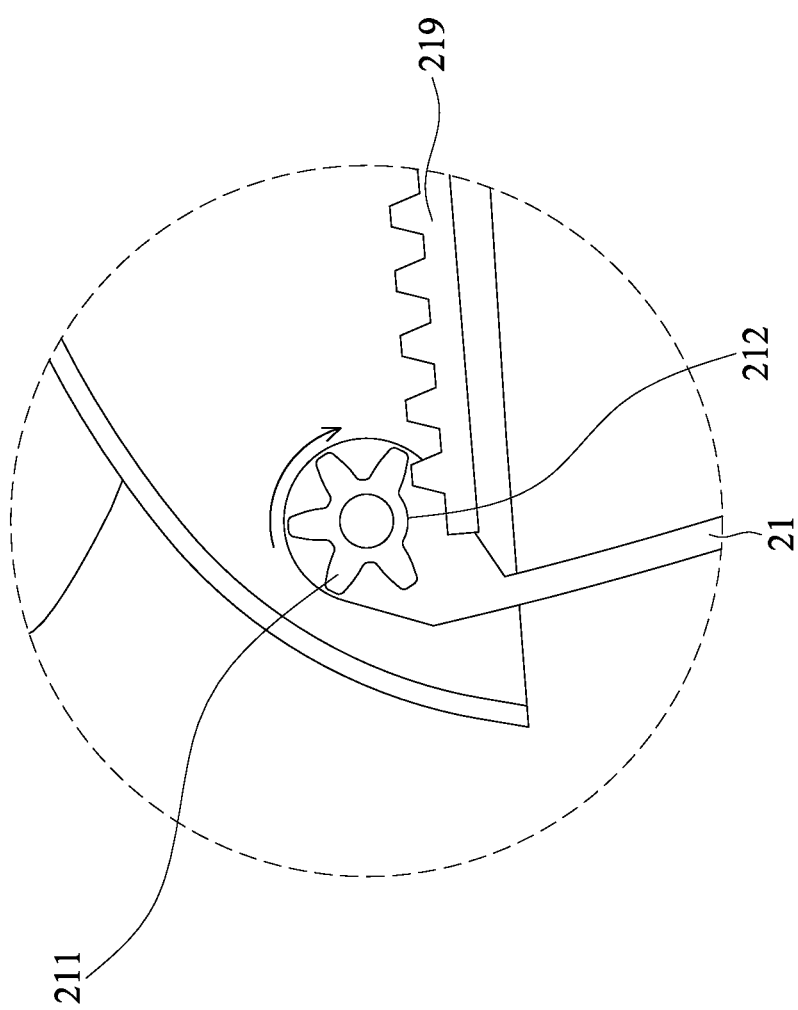
Figure 3C:
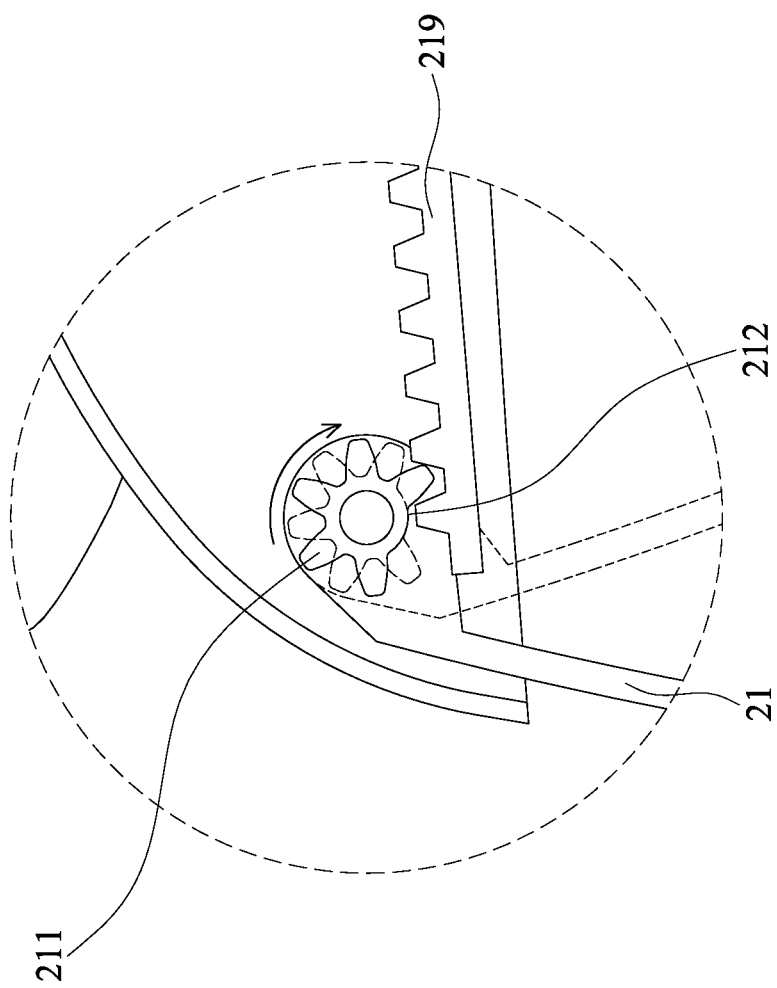

FIGS. 3A, 3B and 3C show the details of the first temple gear of the embodiment of the invention. With reference to FIGS. 3A, 3B and 3C, in one embodiment, the first temple gear 211 comprises a first empty-stroke portion 212. When the first frame temple 21 is rotated from a third posture (FIG. 3A) to the first posture (FIG. 3B), the first empty-stroke portion 212 corresponds to the first driven rack 219. Therefore, during the first frame temple 21 being rotated from the third posture (FIG. 3A) to the first posture (FIG. 3B), the first driven rack 219 is not moved by the first temple rack 211. Similarly, the second temple gear 221 comprises a second empty-stroke portion (not shown). When the second frame temple 22 is rotated from the third posture to the first posture, the second empty-stroke portion corresponds to the second driven rack 229.

With reference to FIG. 1, in one embodiment, the gear unit G1 is a tower gear 3. The tower gear 3 comprises a rear gear portion 32 and a front gear portion 31. The first driven rack 219 and the second driven rack 229 are connected to the rear gear portion 32, and the first module rack 119 and the second module rack 129 are connected to the front gear portion 31.

Figure 4:
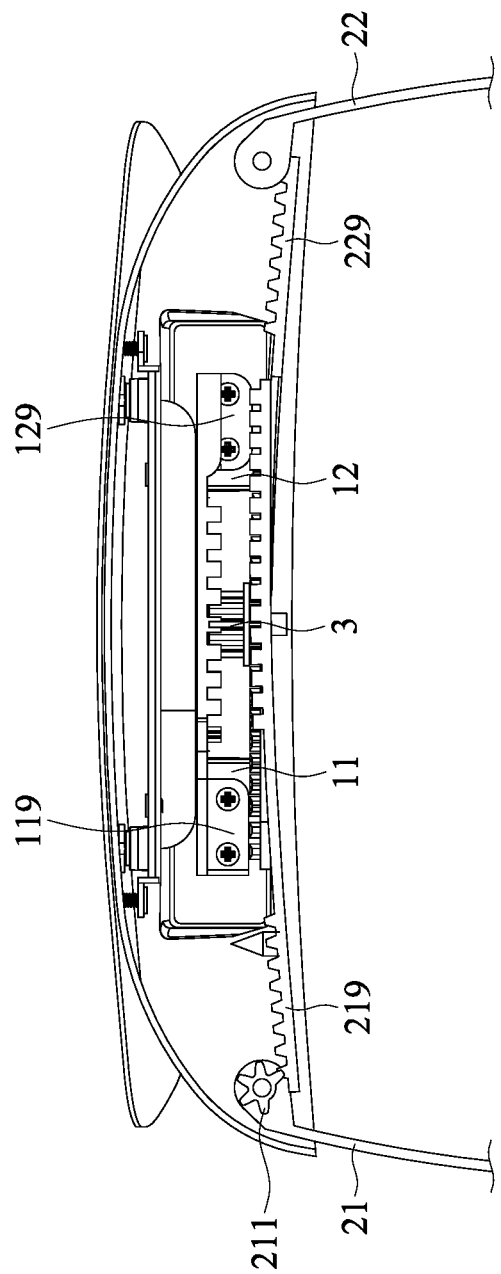
FIG. 4 shows the movement of the gear unit of the first embodiment of the invention.

FIG. 4 shows the movement of the gear unit of the first embodiment of the invention. With reference to FIGS. 1 and 4, when the user wears the head mounted display, the first frame temple 21 and the second frame temple 22 are rotated. The first temple gear 211 moves the first driven rack 219. The second temple gear 221 moves the second driven rack 229. The first driven rack 219 and the second driven rack 229 move the tower gear 3. The tower gear 3 moves the first module rack 119 and the second module rack 129 to change the distance between the first display module 11 and the second display module 12.

Figure 5:
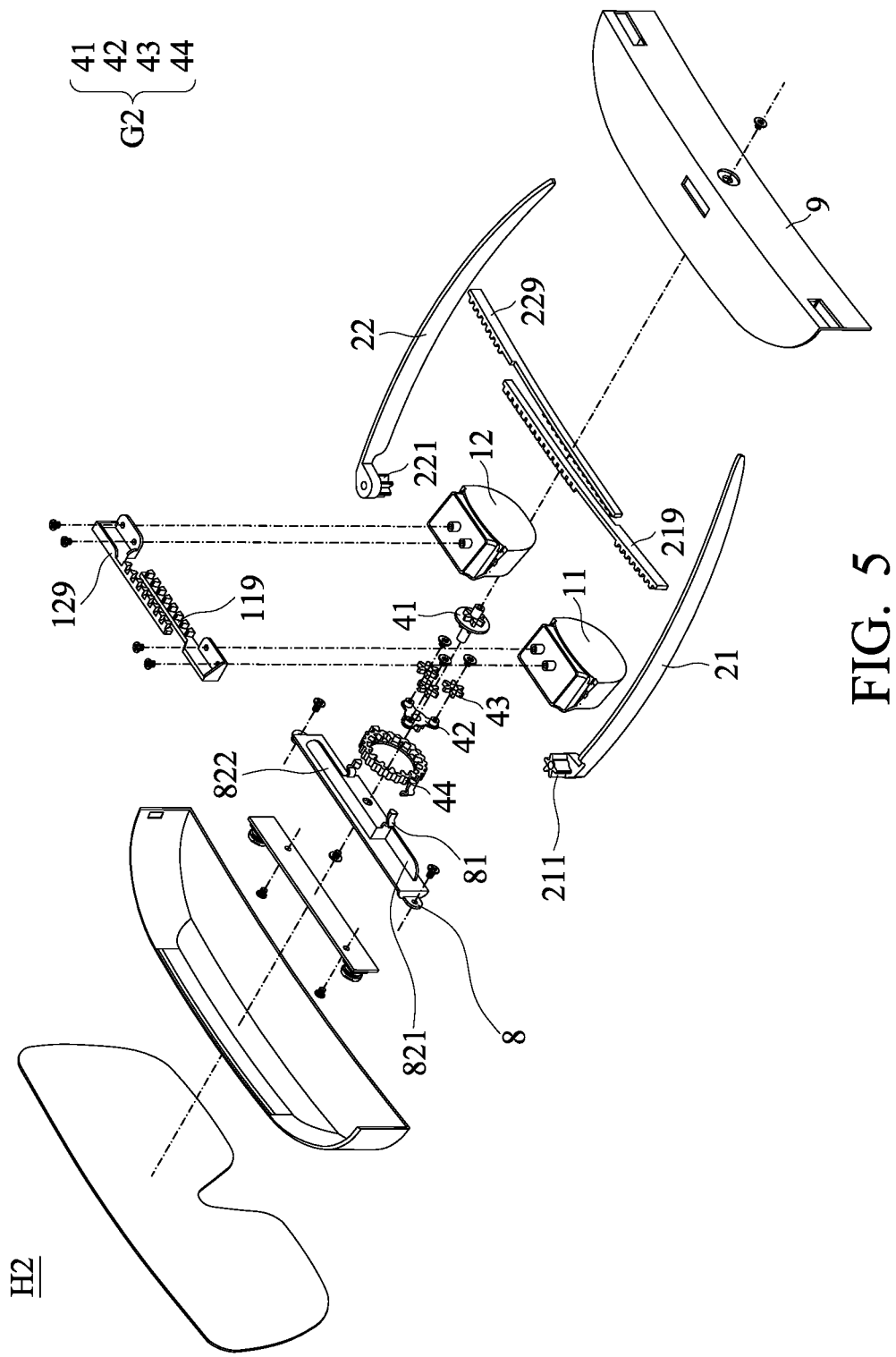
FIG. 5 is an exploded view of a head mounted display of a second embodiment of the invention.

FIG. 5 is an exploded view of a head mounted display of a second embodiment of the invention. With reference to FIG. 5, the gear unit G2 of the head mounted display H2 of the second embodiment of the invention includes a sun gear 41, a planet carrier 42, a plurality of planet gears 43 and an exterior ring 44. The first driven rack 219 and the second driven rack 229 are connected to the sun gear 41. The sun gear 41 is connected to the planet gears 43. The planet gears 43 are disposed on the planet carrier 42. The exterior ring 44 surrounds the planet gears 43 and is connected to the planet gears 43. The first module rack 119 and the second module rack 129 are connected to the planet carrier 42.

Figure 6A:
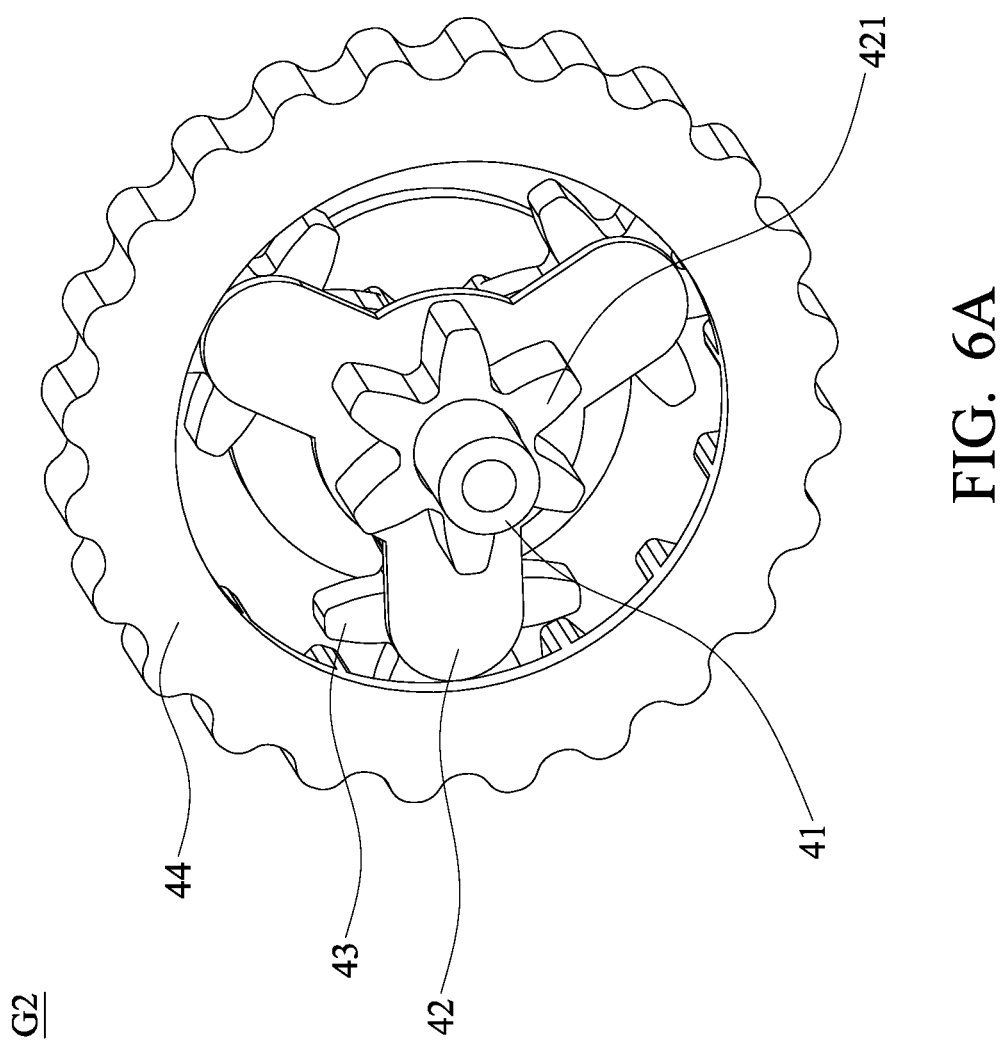
FIGS. 6A and 6B show the details of the gear unit of the second embodiment of the invention.
Figure 6B:
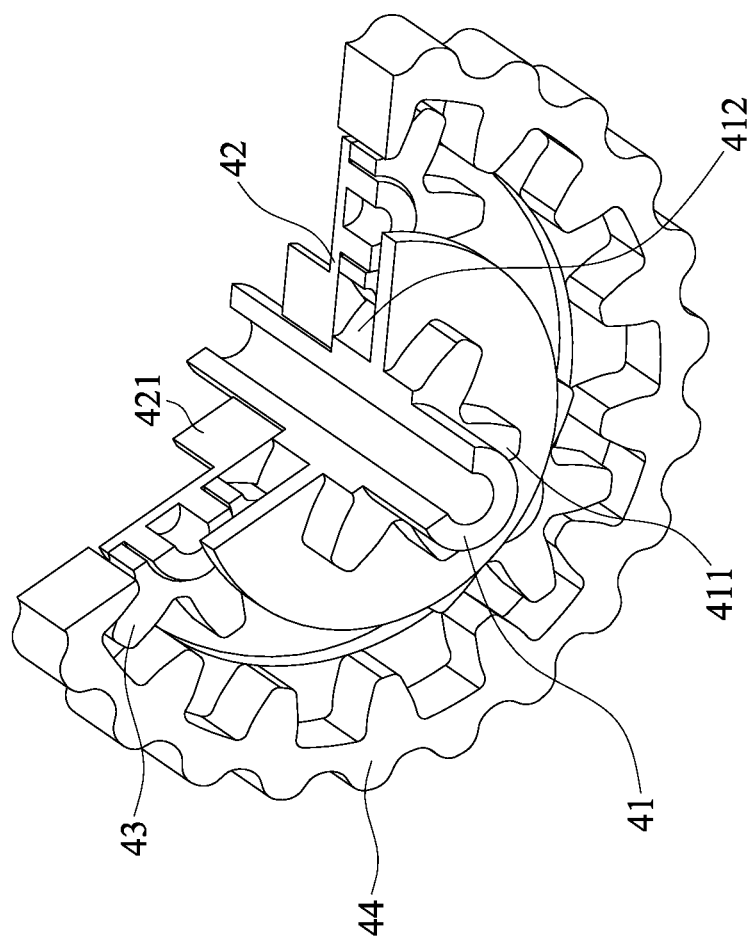

FIGS. 6A and 6B show the details of the gear unit of the second embodiment of the invention. With reference to FIGS. 6A and 6B, the sun gear 41 of the gear unit G2 of the second embodiment of the invention comprises a first sun teeth portion 411 and a second sun teeth portion 412. The planet carrier 42 comprises a carrier teeth portion 421. The first driven rack 219 and the second driven rack 229 are connected to the first sun teeth portion 411 and are adapted to move the sun gear 41. The planet gears 43 are connected to the second sun teeth portion 412. The planet carrier 42 are connected to the first module rack 119 and the second module rack 129 via the carrier teeth portion 421 to move the first module rack 119 and the second module rack 129.

Figure 7A:
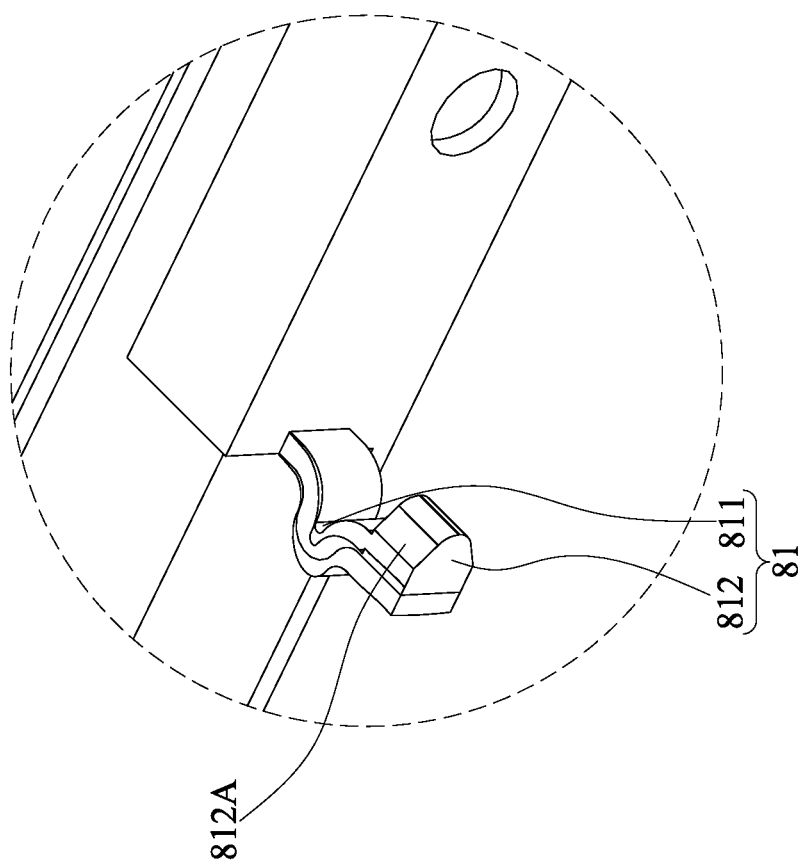
FIG. 7A shows an elastic hook of the embodiment of the invention.
Figure 7B:
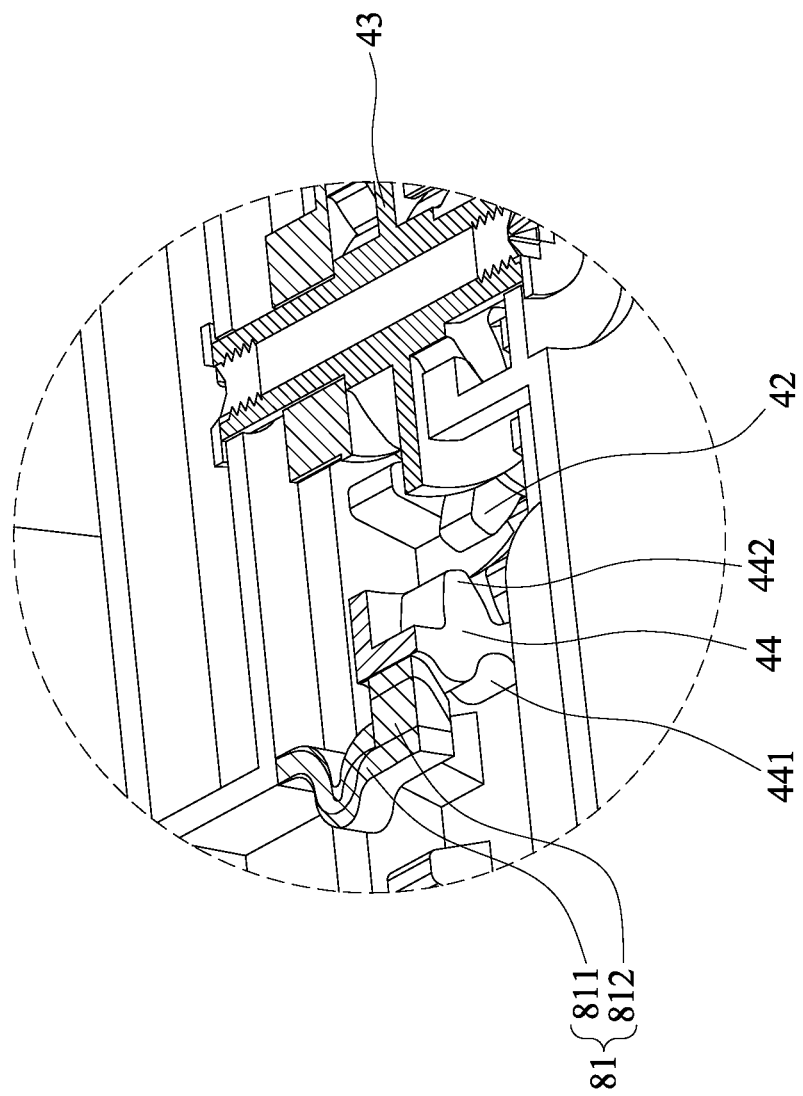
FIG. 7B is a cross sectional view of the elastic hook and the exterior ring of the embodiment of the invention.
Figure 8A:
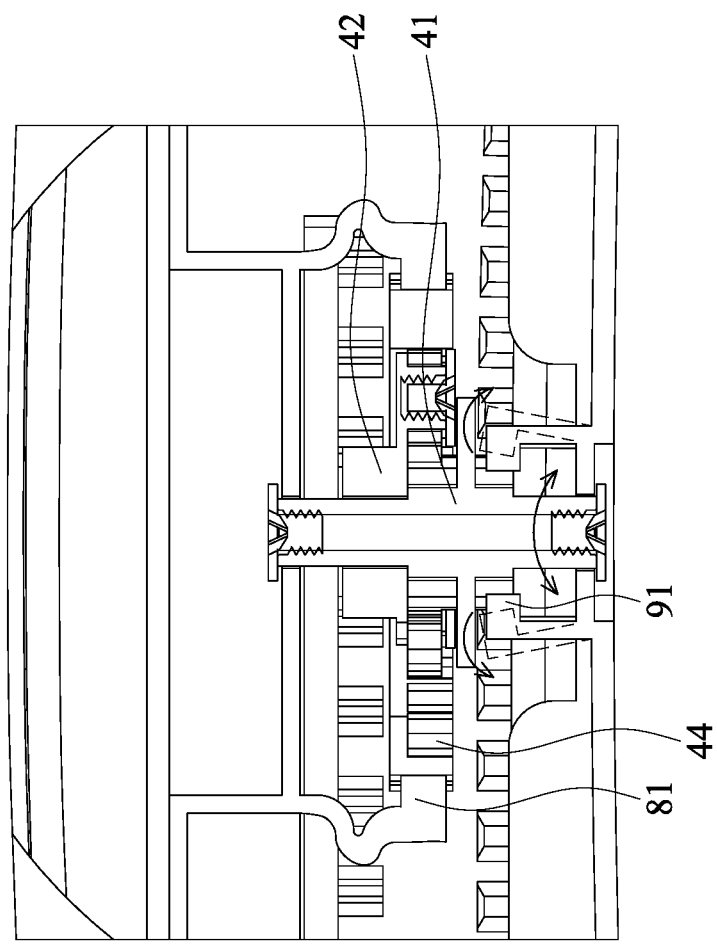
FIG. 8A shows a rough-tuning state of the head mounted display of the second embodiment of the invention.
Figure 8B:
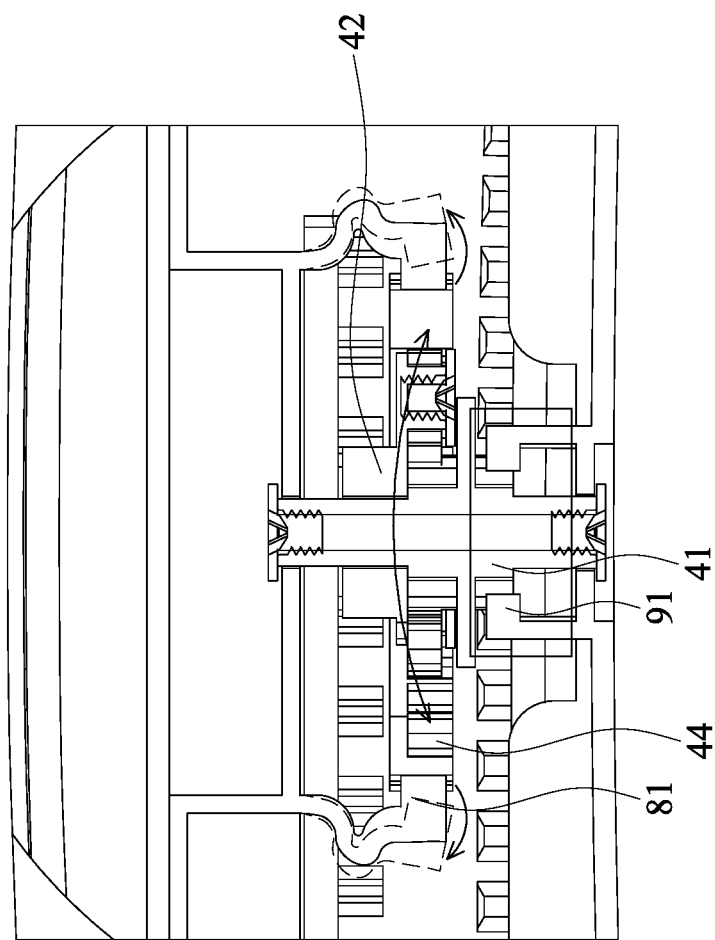
FIG. 8B shows a fine-tuning state of the head mounted display of the second embodiment of the invention.

FIG. 7A shows an elastic hook of the embodiment of the invention. FIG. 7B is a cross sectional view of the elastic hook and the exterior ring of the embodiment of the invention. FIG. 8A shows a rough-tuning state of the head mounted display of the second embodiment of the invention. FIG. 8B shows a fine-tuning state of the head mounted display of the second embodiment of the invention. With reference to FIGS. 7A, 7B, 8A and 8B, in one embodiment, the head mounted display further comprises at least one first elastic hook 81 and at least one second elastic hook 91. The exterior ring 44 comprises an exterior teeth portion 441 and an interior teeth portion 442. The interior teeth portion 442 is connected to the planet gears 43. The first elastic hook 81 is wedged into the exterior teeth portion 441 and is adapted to restrict the exterior ring 44. The second elastic hook 91 is wedged into the first sun teeth portion 411 and is adapted to restrict the sun gear 41.

With reference to FIGS. 7A and 7B, in one embodiment, the first elastic hook 81 comprises a cantilever beam 811 and a hook portion 812. The hook portion 812 is formed on a free end of the cantilever beam 811. A wedging surface 812A of the wedging portion 812 is a curved surface.

With reference to FIGS. 5, 8A and 8B, in one embodiment, the head mounted display further comprises an interior bracket 8 and a rear cover 9. The first elastic hook 81 is disposed on the interior bracket 8. The interior bracket 8 further comprises a first restriction rib 821 and a second restriction rib 822. The first restriction rib 821 is adapted to restrict the first module rack 119. The second restriction rib 822 is adapted to restrict the second module rack 129. The second elastic hook 91 is disposed on the rear cover 9.

With reference to FIGS. 5 and 8A, in one embodiment, in a rough-tuning state, the first elastic hook 81 restricts the exterior ring 44. The first frame temple 21 and the second frame temple 22 are rotated. The first temple gear 211 moves the first driven rack 219. The second temple gear 221 moves the second driven rack 229. The first driven rack 219 and the second driven rack 229 move the sun gear 41. The sun gear 41 moves the planet gears 43 to rotate the planet carrier 42. The planet carrier 42 moves the first module rack 119 and the second module rack 129 to change the distance between the first display module 11 and the second display module 12. Under the rough-tuning state, the second elastic arm 91 is pushed, and the sun gear 41 is thus rotatable.

With reference to FIGS. 5 and 8B, in one embodiment, in a fine-tuning state, the second elastic hook 91 restricts the sun gear 41. The exterior ring 44 is rotated. The exterior ring 44 moves the planet gears 43 to rotate the planet carrier 42. The planet carrier 42 moves the first module rack 119 and the second module rack 129 to change the distance between the first display module 11 and the second display module 12. Under the fine-tuning state, the first elastic arm 81 is pushed, and the exterior ring 44 is thus rotatable.

Figure 9:
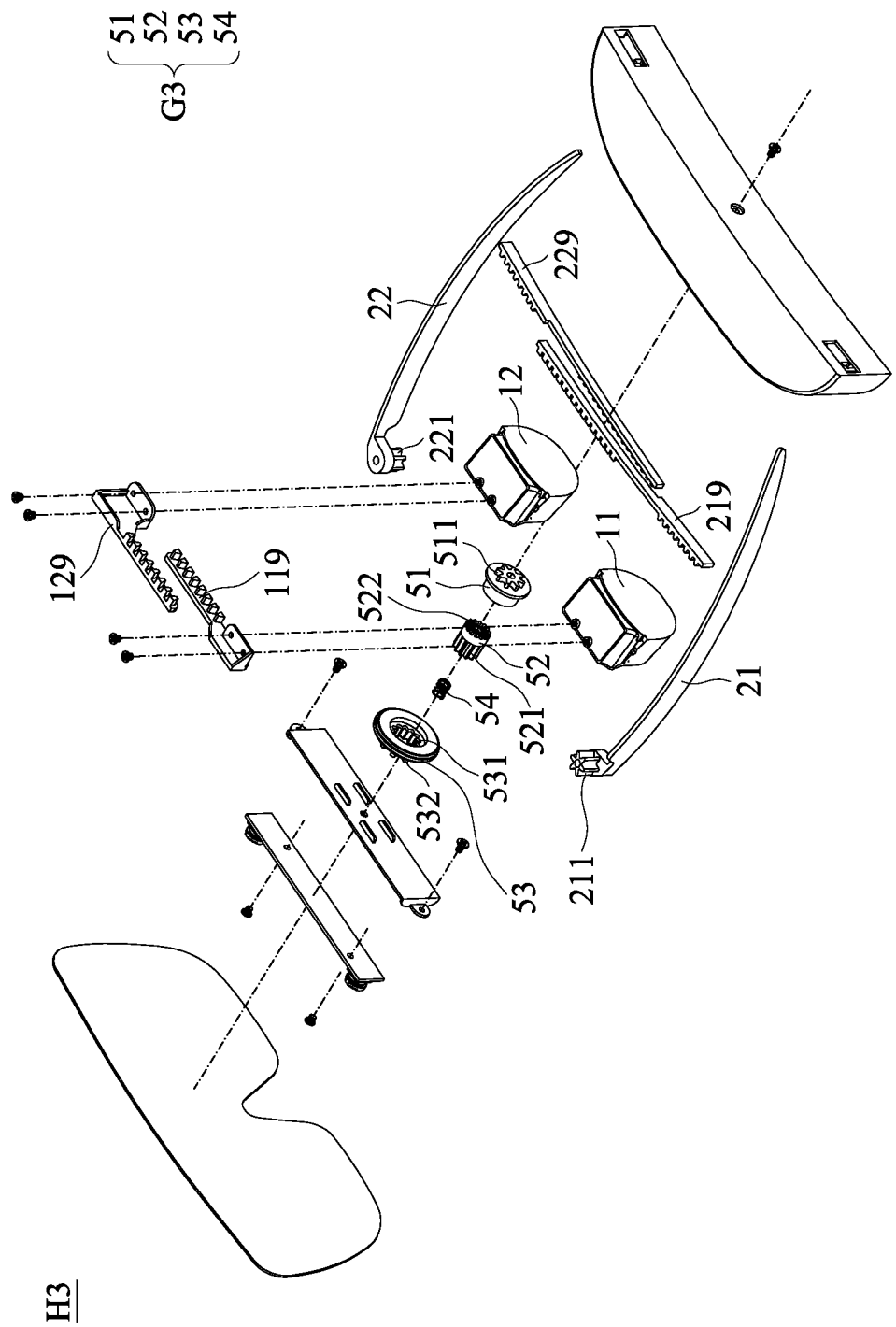
FIG. 9 is an exploded view of a head mounted display of a third embodiment of the invention.

FIG. 9 is an exploded view of a head mounted display of a third embodiment of the invention. With reference to FIG. 9, the gear unit G3 of the head mounted display H3 of the third embodiment of the invention includes a knob 53, a first gear member 51, a second gear member 52 and a spring 54. The first gear member 51 is adapted to be connected to the second gear member 52. The second gear member 52 is connected to the knob 53. The spring 54 is disposed between the knob 53 and the second gear member 52.

Figure 10A:
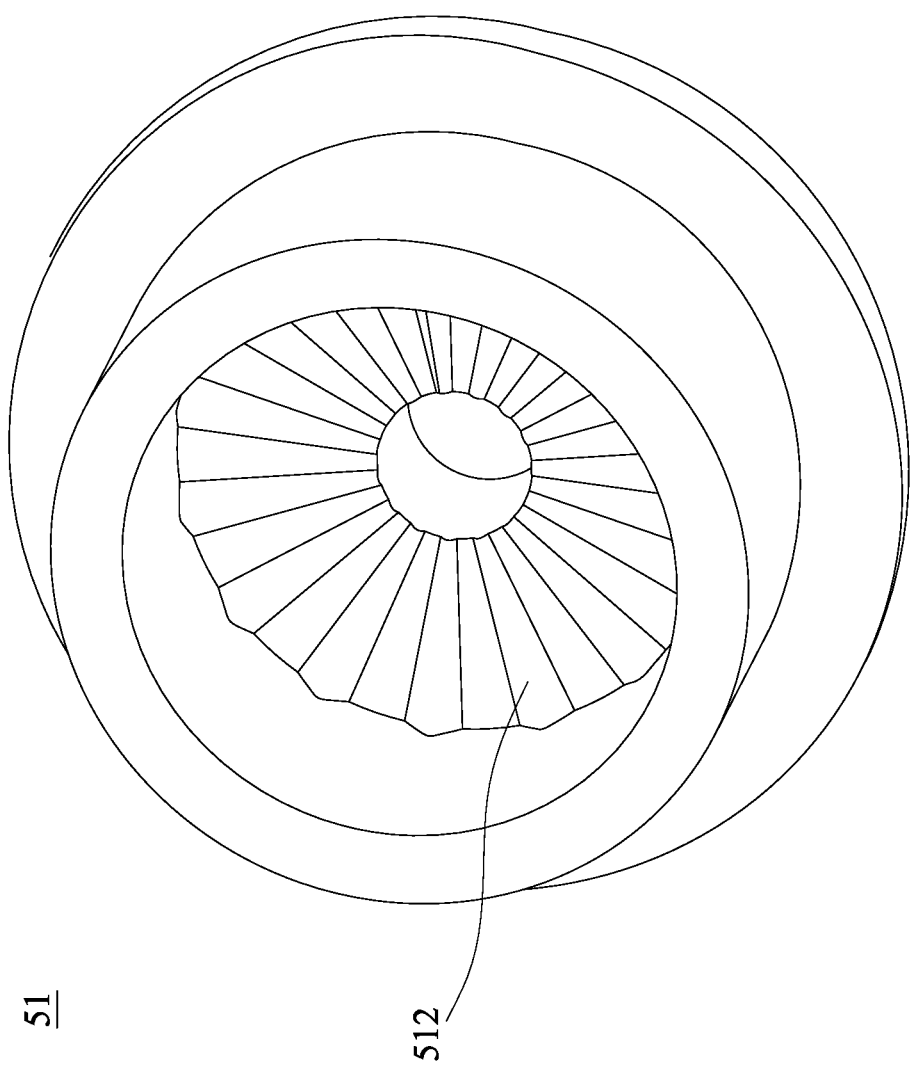
FIG. 10A shows the details of the first gear member of the third embodiment of the invention.
Figure 10B:
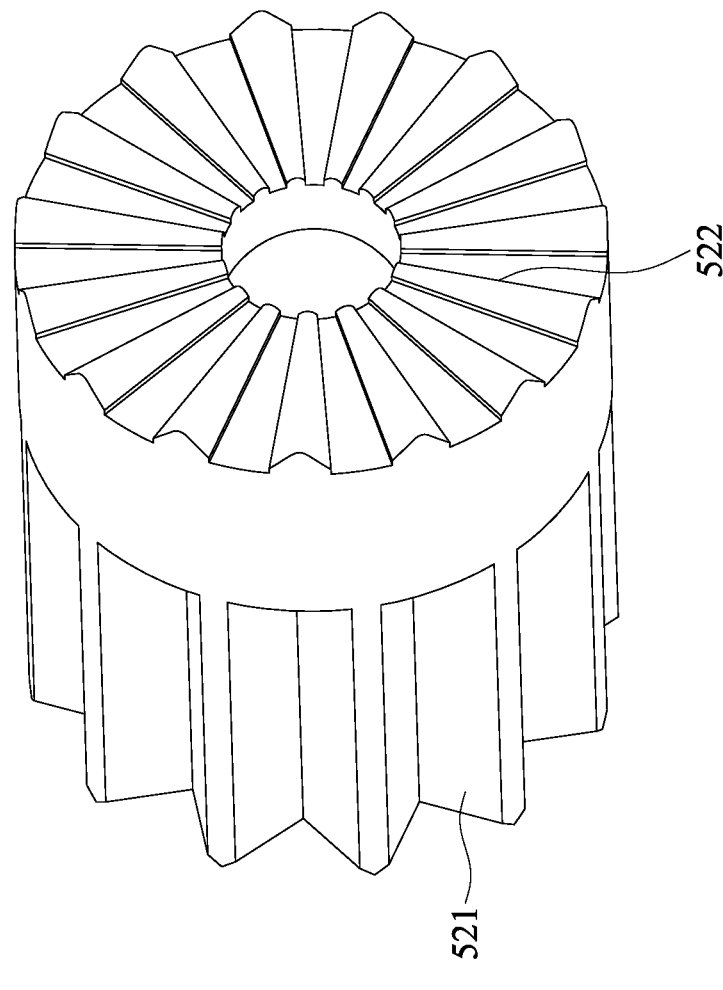
FIG. 10B shows the details of the second gear member of the third embodiment of the invention.

FIG. 10A shows the details of the first gear member of the third embodiment of the invention. FIG. 10B shows the details of the second gear member of the third embodiment of the invention. With reference to FIGS. 9, 10A and 10B, in one embodiment, the first gear member 51 comprises a rear teeth portion 511 and a first clutch portion 512. The second gear member 52 comprises a wedging portion 521 and a second clutch portion 522. The knob 53 comprises a wedging recess 531 and a front teeth portion 532. The first clutch portion 512 is adapted to be connected to the second clutch portion 522. The wedging portion 521 is adapted to be wedged into the wedging recess 531.

With reference to FIG. 9, in one embodiment, the first driven rack 219 and the second driven rack 229 are connected to the rear teeth portion 511 and adapted to move the first gear member 51. The knob 53 is connected to the first module rack 119 and the second module rack 129 via the front teeth portion 532 and is adapted to move the first module rack 119 and the second module rack 129.

Figure 11A:
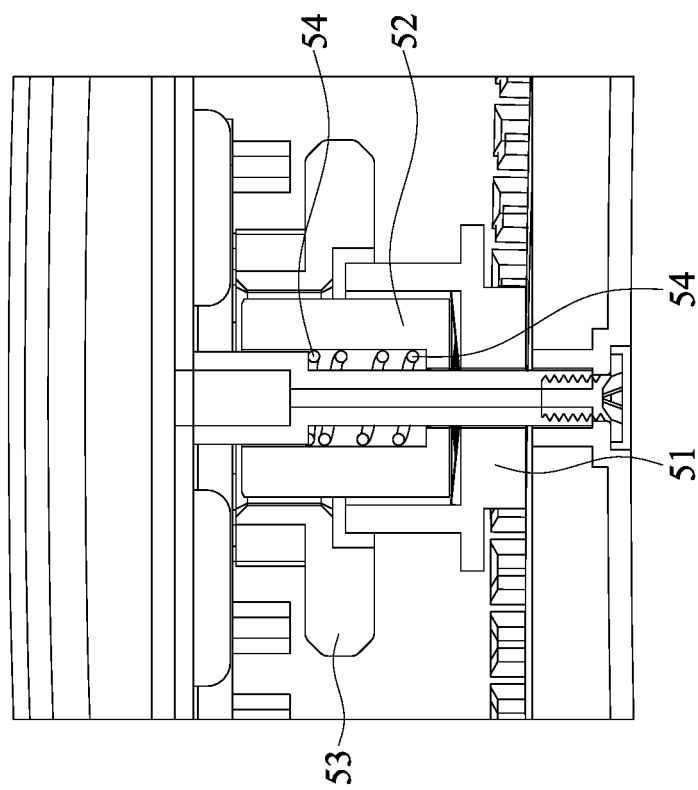
FIG. 11A shows a rough-tuning state of the head mounted display of the third embodiment of the invention.

FIG. 11A shows a rough-tuning state of the head mounted display of the third embodiment of the invention. With reference to FIGS. 9 and 11A, in one embodiment, in a rough-tuning state, the first frame temple 21 and the second frame temple 22 are rotated. The first temple gear 211 moves the first driven rack 219. The second temple gear 221 moves the second driven rack 229. The first driven rack 219 and the second driven rack 229 move the first gear member 51. The first gear member 51 moves the second gear member 52 to rotate the knob 53. The knob 53 moves the first module rack 119 and the second module rack 129 to change the distance between the first display module 11 and the second display module 12.

Figure 11B:
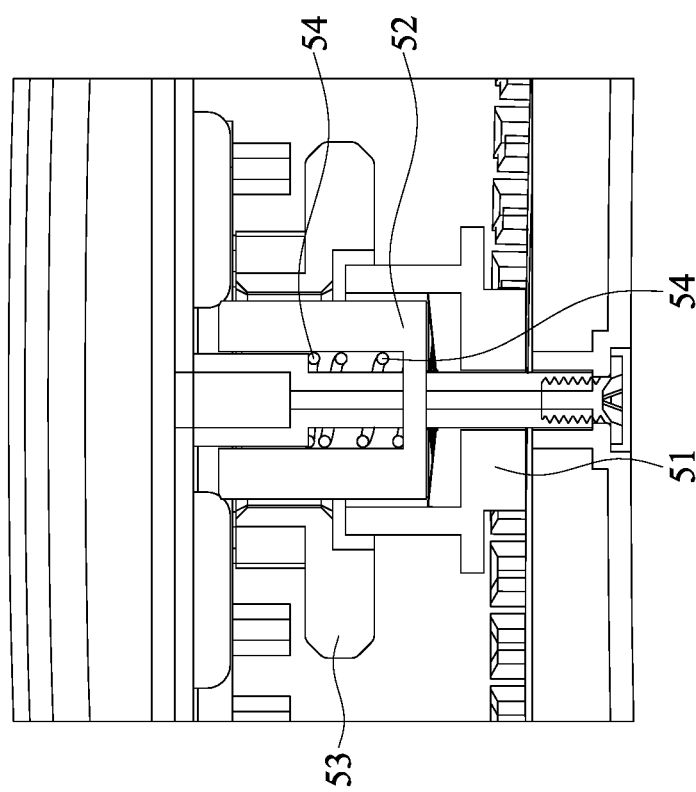
FIG. 11B shows a fine-tuning state of the head mounted display of the third embodiment of the invention.

FIG. 11B shows a fine-tuning state of the head mounted display of the third embodiment of the invention. With reference to FIGS. 9, 10A, 10B and 11B, in one embodiment, in a fine-tuning state, the knob 53 is rotated, the knob 53 moves the first module rack 119 and the second module rack 129 to change the distance between the first display module 11 and the second display module 12. The spring 54 is pressed to allow the second clutch portion 522 to be rotated relative to the first clutch portion 512.

Figure 12B:
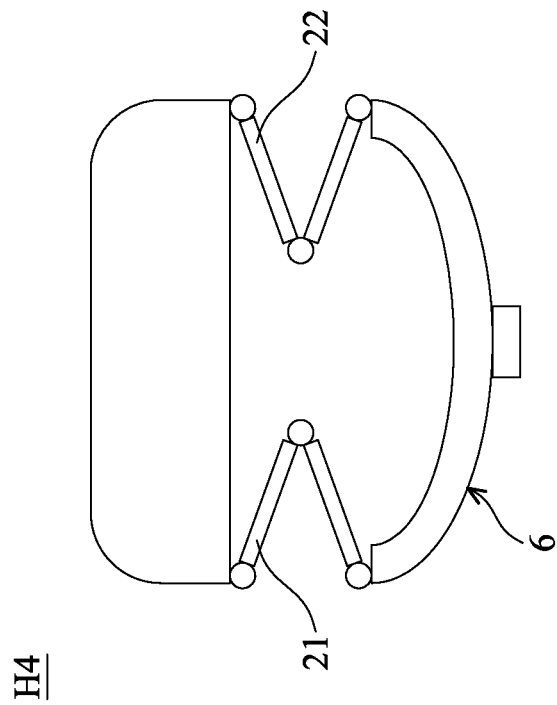
FIGS. 12A and 12B show the head mounted display of a fourth embodiment of the invention.
Figure 12A:
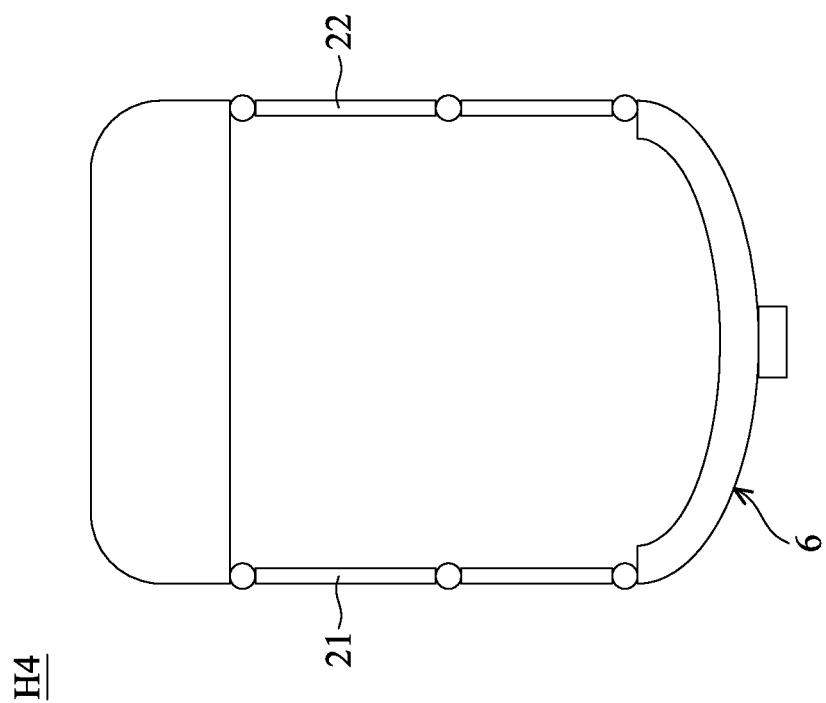

FIGS. 12A and 12B show the head mounted display of a fourth embodiment of the invention. With reference to FIGS. 12A and 12B, in one embodiment, the head mounted display H4 further comprises a headband unit 6. The headband unit 6 is connected to the first frame temple 21 and the second frame temple 22. When a user wears the head mounted display, the first frame temple 21, the second frame temple 22 and the headband unit 6 contact the head of the user simultaneously. The headband unit 6 can include hard material (such as PC or PA) or flexible material (such as elastic band or devil felt). The headband unit 6 can be rotatably connected to the first frame temple 21 and the second frame temple 22, or connected to the first frame temple 21 and the second frame temple 22 by other ways.

In another embodiment, the first temple gear and the second temple gear can move the gear unit directly, and the gear unit moves the first module rack and the second module rack to modify the interpupillary distance. The disclosure is not meant to restrict the invention.

Utilizing the head mounted display of the embodiments of the invention, the Eye-box of the display modules can sufficiently cover the IPD of most users and the difference in the design value. When multiple people need to use the head mounted display interactively in one occasion, the head mounted display can be directly worn. The head mounted display automatically completes the IPD adjustment after being worn, and optimizes the operation by the frame temple driving mechanism. Therefore, the user can use it more intuitively and more conveniently. When the user's head width and IPD are beyond the normal range of human factors or the eye-box of the display modules is too small, and the adjustment of the frame temple is no longer sufficient, the embodiments of the invention additionally provide IPD fine-tuning mechanisms to meet this situation. The user can use the exterior ring or the knob to fine-tune the distance between the display modules to improve visual comfort and immersion.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A head mounted display, comprising:
a first display module;
a second display module;
an adjustment mechanism, connected to the first display module and the second display module;
a first frame temple, connected to the adjustment mechanism; and
a second frame temple, connected to the adjustment mechanism, wherein the first frame temple and the second frame temple are adapted rotated to move the adjustment mechanism, and the adjustment mechanism moves the first display module relative to the second display module.

2. The head mounted display as claimed in claim 1, wherein the first frame temple and the second frame temple are adapted to rotate between a first posture and a second posture, and when the first frame temple and the second frame temple are in the first posture, a first distance is formed between the first display module and the second display module, and when the first frame temple and the second frame temple are in the second posture, a second distance is formed between the first display module and the second display module.

3. The head mounted display as claimed in claim 2, wherein the adjustment mechanism comprises a gear unit, a first module rack, a second module rack, a first driven rack and a second driven rack, the first frame temple comprises a first temple gear, the second frame temple comprises a second temple gear, the first temple gear is connected to the first driven rack and adapted to move the first driven rack, the second temple gear is connected to the second driven rack and adapted to move the second driven rack, the first driven rack and the second driven rack are connected to the gear unit and adapted to move the gear unit, the gear unit is connected to the first module rack and the second module rack and is adapted to move the first module rack and the second module rack, the first display module is connected to the first module rack, and the second display module is connected to the second module rack.

4. The head mounted display as claimed in claim 3, wherein the first temple gear comprises a first empty-stroke portion, the second temple gear comprises a second empty-stroke portion, and when the first frame temple and the second frame temple are rotated from a third posture to the first posture, the first empty-stroke portion corresponds to the first driven rack, and the second empty-stroke portion corresponds to the second driven rack.

5. The head mounted display as claimed in claim 3, wherein the gear unit comprises a tower gear, the tower gear comprises a rear gear portion and a front gear portion, the first driven rack and the second driven rack are connected to the rear gear portion, and the first module rack and the second module rack are connected to the front gear portion.

6. The head mounted display as claimed in claim 3, wherein the gear unit comprises a sun gear, a planet carrier, a plurality of planet gears and an exterior ring, the first driven rack and the second driven rack are connected to the sun gear, the sun gear is connected to the planet gears, the planet gears are disposed on the planet carrier, the exterior ring surrounds the planet gears and is connected to the planet gears, and the first module rack and the second module rack are connected to the planet carrier.

7. The head mounted display as claimed in claim 6, wherein the sun gear comprises a first sun teeth portion and a second sun teeth portion, the planet carrier comprises a carrier teeth portion, the first driven rack and the second driven rack are connected to the first sun teeth portion and are adapted to move the sun gear, the planet gears are connected to the second sun teeth portion, the planet carrier are connected to the first module rack and the second module rack via the carrier teeth portion to move the first module rack and the second module rack.

8. The head mounted display as claimed in claim 7, further comprising at least one first elastic hook and at least one second elastic hook, wherein the exterior ring comprises an exterior teeth portion and an interior teeth portion, the interior teeth portion is connected to the planet gears, the first elastic hook is wedged into the exterior teeth portion and is adapted to restrict the exterior ring, and the second elastic hook is wedged into the first sun teeth portion and is adapted to restrict the sun gear.

9. The head mounted display as claimed in claim 8, wherein the first elastic hook comprises a cantilever beam and a hook portion, the hook portion is formed on a free end of the cantilever beam, and a wedging surface of the wedging portion is a curved surface.

10. The head mounted display as claimed in claim 8, further comprising an interior bracket and a rear cover, the first elastic hook is disposed on the interior bracket, the interior bracket further comprises a first restriction rib and a second restriction rib, the first restriction rib is adapted to restrict the first module rack, the second restriction rib is adapted to restrict the second module rack, and the second elastic hook is disposed on the rear cover.

11. The head mounted display as claimed in claim 8, wherein in a rough-tuning state, the first elastic hook restricts the exterior ring, the first frame temple and the second frame temple are rotated, the first temple gear moves the first driven rack, the second temple gear moves the second driven rack, the first driven rack and the second driven rack move the sun gear, the sun gear moves the planet gears to rotate the planet carrier, the planet carrier moves the first module rack and the second module rack to change the distance between the first display module and the second display module.

12. The head mounted display as claimed in claim 11, wherein in a fine-tuning state, the second elastic hook restricts the sun gear, the exterior ring is rotated, the exterior ring moves the planet gears to rotate the planet carrier, and the planet carrier moves the first module rack and the second module rack to change the distance between the first display module and the second display module.

13. The head mounted display as claimed in claim 3, wherein the gear unit comprises a knob, a first gear member, a second gear member and a spring, the first gear member is adapted to be connected to the second gear member, the second gear member is connected to the knob, and the spring is disposed between the knob and the second gear member.

14. The head mounted display as claimed in claim 13, wherein the first gear member comprises a rear teeth portion and a first clutch portion, the second gear member comprises a wedging portion and a second clutch portion, the knob comprises a wedging recess and a front teeth portion, the first clutch portion is adapted to be connected to the second clutch portion, and the wedging portion is adapted to be wedged into the wedging recess.

15. The head mounted display as claimed in claim 14, wherein the first driven rack and the second driven rack are connected to the rear teeth portion and adapted to move the first gear member, the knob is connected to the first module rack and the second module rack via the front teeth portion and is adapted to move the first module rack and the second module rack.

16. The head mounted display as claimed in claim 15, wherein in a rough-tuning state, the first frame temple and the second frame temple are rotated, the first temple gear moves the first driven rack, the second temple gear moves the second driven rack, the first driven rack and the second driven rack move the first gear member, the first gear member moves the second gear member to rotate the knob, the knob moves the first module rack and the second module rack to change the distance between the first display module and the second display module.

17. The head mounted display as claimed in claim 16, wherein in a fine-tuning state, the knob is rotated, the knob moves the first module rack and the second module rack to change the distance between the first display module and the second display module, and the spring is pressed to allow the second clutch portion to be rotated relative to the first clutch portion.

18. The head mounted display as claimed in claim 2, further comprising a headband unit, wherein the headband unit is connected to the first frame temple and the second frame temple, and when a user wears the head mounted display, the first frame temple, the second frame temple and the headband unit contact the head of the user simultaneously.

19. The head mounted display as claimed in claim 2, wherein the adjustment mechanism comprises a gear unit, a first module rack and a second module rack, the first frame temple comprises a first temple gear, the second frame temple comprises a second temple gear, the first temple gear is connected to the gear unit and adapted to move the gear unit, the second temple gear is connected to the gear unit and adapted to move the gear unit, the gear unit is connected to the first module rack and the second module rack and is adapted to move the first module rack and the second module rack, the first display module is connected to the first module rack, and the second display module is connected to the second module rack.

\* \* \* \* \*